US006866576B2

United States Patent
Quinn et al.

(10) Patent No.: US 6,866,576 B2
(45) Date of Patent: Mar. 15, 2005

(54) APPARATUS FOR REDUCING NOISE ENTERING A VEHICLE PASSENGER COMPARTMENT THROUGH A PRESSURE RELIEF VALVE

(75) Inventors: Shawn G. Quinn, Warren, MI (US); James J. Nickerson, Dearborn, MI (US); Gregory J. Fadler, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/462,248

(22) Filed: Jun. 16, 2003

(65) Prior Publication Data

US 2004/0253566 A1 Dec. 16, 2004

(51) Int. Cl.⁷ ................................................ F24F 13/24
(52) U.S. Cl. ...................................... 454/162; 454/906
(58) Field of Search ................................ 454/162, 164, 454/166, 906, 165; 181/141, 224, 225; 137/512.15, 512.1

(56) References Cited

U.S. PATENT DOCUMENTS

| 3,286,617 A | * | 11/1966 | Shirk | 454/165 |
| 4,537,115 A | * | 8/1985 | Haesters | 454/165 |
| 5,105,731 A | * | 4/1992 | Kraus | 454/143 |
| 5,472,378 A | * | 12/1995 | Skoff | 454/141 |
| 6,273,127 B1 | * | 8/2001 | Wade | 137/512.15 |

* cited by examiner

Primary Examiner—Harold Joyce
(74) Attorney, Agent, or Firm—Tarolli, Sundheim, Covel & Tummino L.L.P.

(57) ABSTRACT

An apparatus (10) includes a pressure relief valve (12) for relieving air pressure from a passenger compartment (76) of a vehicle (66). The pressure relief valve (12) enables airflow from the passenger compartment (76) to atmosphere (78). The apparatus (10) also includes a member (14) for reducing noise entering the passenger compartment (76) as a result of a backflow of air through the pressure relief valve (12) from atmosphere (78) to the passenger compartment (76). The member (14) includes structure (112, 114) for attaching the member (14) to the pressure relief valve (12).

15 Claims, 4 Drawing Sheets

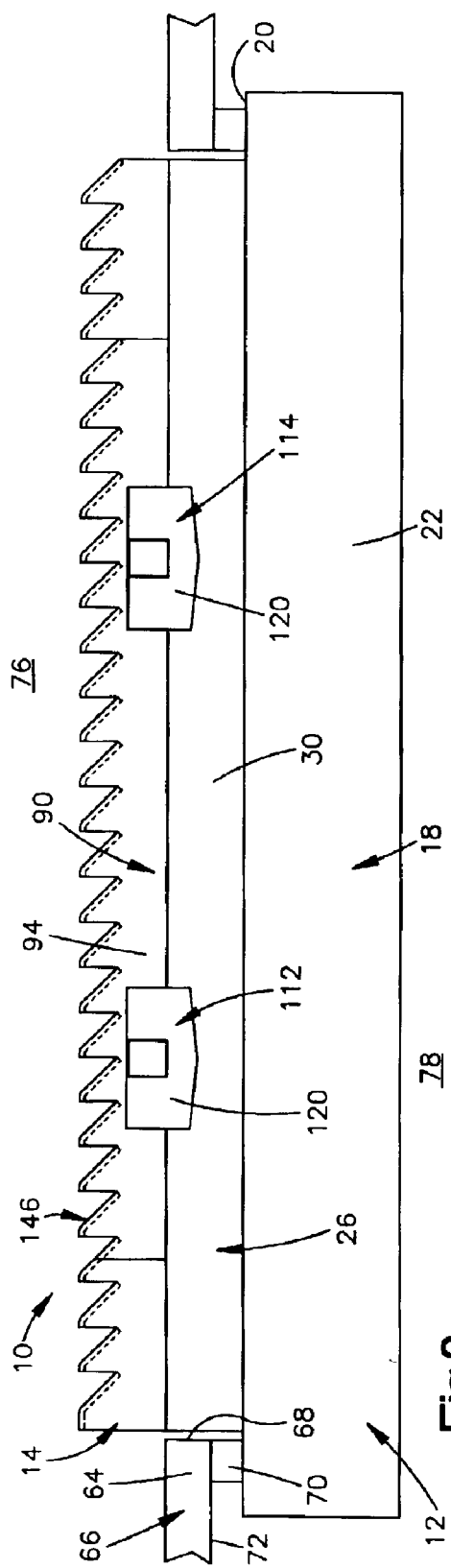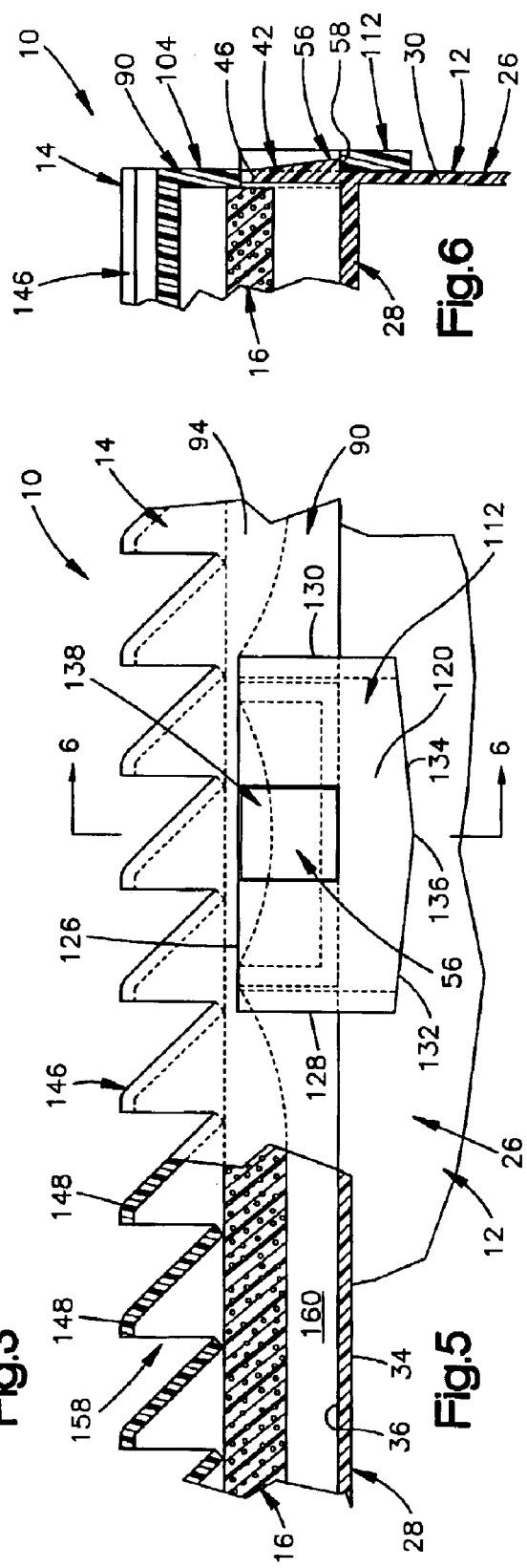

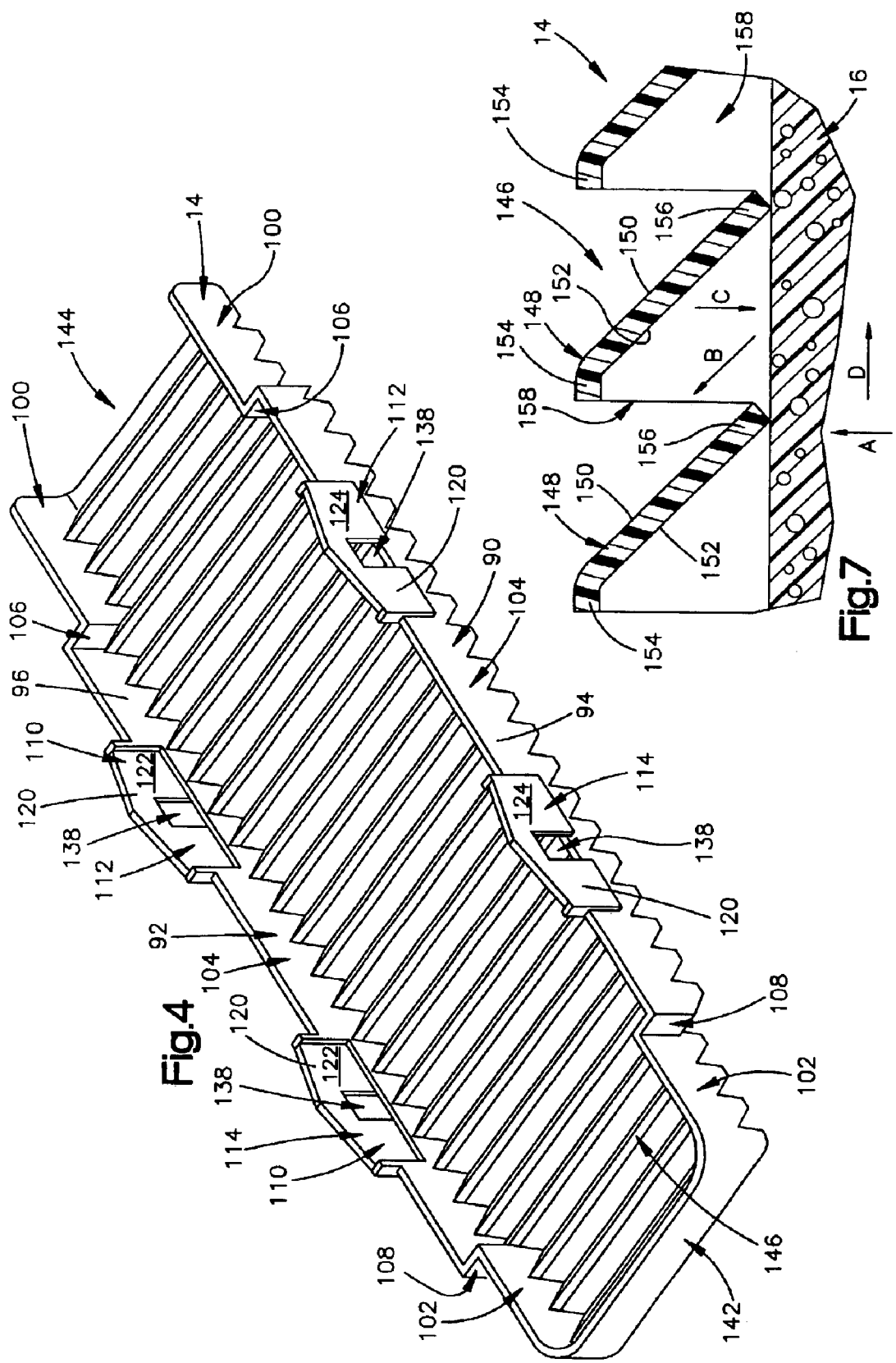

APPARATUS FOR REDUCING NOISE ENTERING A VEHICLE PASSENGER COMPARTMENT THROUGH A PRESSURE RELIEF VALVE

TECHNICAL FIELD

The present invention relates to apparatus for reducing noise entering a passenger compartment of a vehicle through a vehicle pressure relief valve.

BACKGROUND OF THE INVENTION

Vehicles are outfitted with pressure relief valves for ventilating the passenger compartment of the vehicle and for preventing a sudden build up of air pressure within the passenger compartment. The air pressure within the passenger compartment of a vehicle may rise suddenly, for example, when a door of the vehicle is slammed shut.

A typical pressure relief valve includes one or more openings. A movable gate covers each opening in the pressure relief valve. The gate operates to cover and uncover the opening in response to a differential pressure across the pressure relief valve. When the air pressure within the passenger compartment is greater than the atmospheric pressure by a predetermined amount, the gate moves to uncover the opening enabling airflow out of the passenger compartment to atmosphere. When the air pressure within the passenger compartment is less than or equal to the atmospheric pressure, the gate covers the opening to prevent airflow from the atmosphere into the passenger compartment. Thus, the typical pressure relief valve acts as a check valve.

The gate of the typical pressure relief valve does not completely seal over the opening in the pressure relief valve. As a result, some airflow may enter the vehicle compartment through the pressure relief valve when the gate covers the opening. Any entering airflow may include noise from outside of the vehicle. The noise entering the pressure relief valve increases the passenger detectable noise within the passenger compartment. It is desirable to reduce the amount of atmospheric noise that is detectable within the passenger compartment.

One known method for decreasing the amount of noise passing through the pressure relief valve into the passenger compartment includes placing a noise absorbing pad near an interior of the pressure relief valve. As a result, much of the noise entering the passenger compartment through the pressure relief valve passes through the opening in the pad.

SUMMARY OF THE INVENTION

The present invention relates to an apparatus comprising a pressure relief valve for relieving air pressure from a passenger compartment of a vehicle. The pressure relief valve enables airflow from the passenger compartment to atmosphere. The apparatus also comprises a member for reducing noise entering the passenger compartment through the pressure relief valve from the atmosphere. The member includes structure for attaching the member to the pressure relief valve.

According to another aspect, the present invention relates to an apparatus for reducing noise entering a passenger compartment of a vehicle through a vehicle pressure relief valve. The apparatus comprises a member associated with the pressure relief valve. The member defines an air chamber that is interposed between the passenger compartment and the pressure relief valve. The member includes a wall having a plurality of angled slats that define louvers through which air flows between the passenger compartment and the air chamber. The plurality of slats changes a direction of air flowing between the passenger compartment and the air chamber so as to reduce noise entering the passenger compartment through the pressure relief valve.

According to yet another aspect, the present invention relates to an apparatus comprising a pressure relief valve for relieving air pressure from a passenger compartment of a vehicle. The pressure relief valve enables airflow from the passenger compartment to atmosphere. The apparatus also comprises a member for reducing noise entering the passenger compartment through the pressure relief valve from the atmosphere. The member defines an air chamber that is interposed between the passenger compartment of the vehicle and the pressure relief valve. The member includes a wall for deflecting airflow exiting the air chamber toward the passenger compartment.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a side view of the apparatus of FIG. 1 illustrating the apparatus mounted to a panel of a vehicle;

FIG. 4 is perspective bottom view of the apparatus of FIG. 1;

FIG. 5 is an enlarged view of a portion of the apparatus of FIG. 1;

FIG. 6 is a view taken along line 6—6 in FIG. 5; and

FIG. 7 is an enlarged view of a portion of FIG. 5.

DETAILED DESCRIPTION OF THE INVENTION

Figure 1:
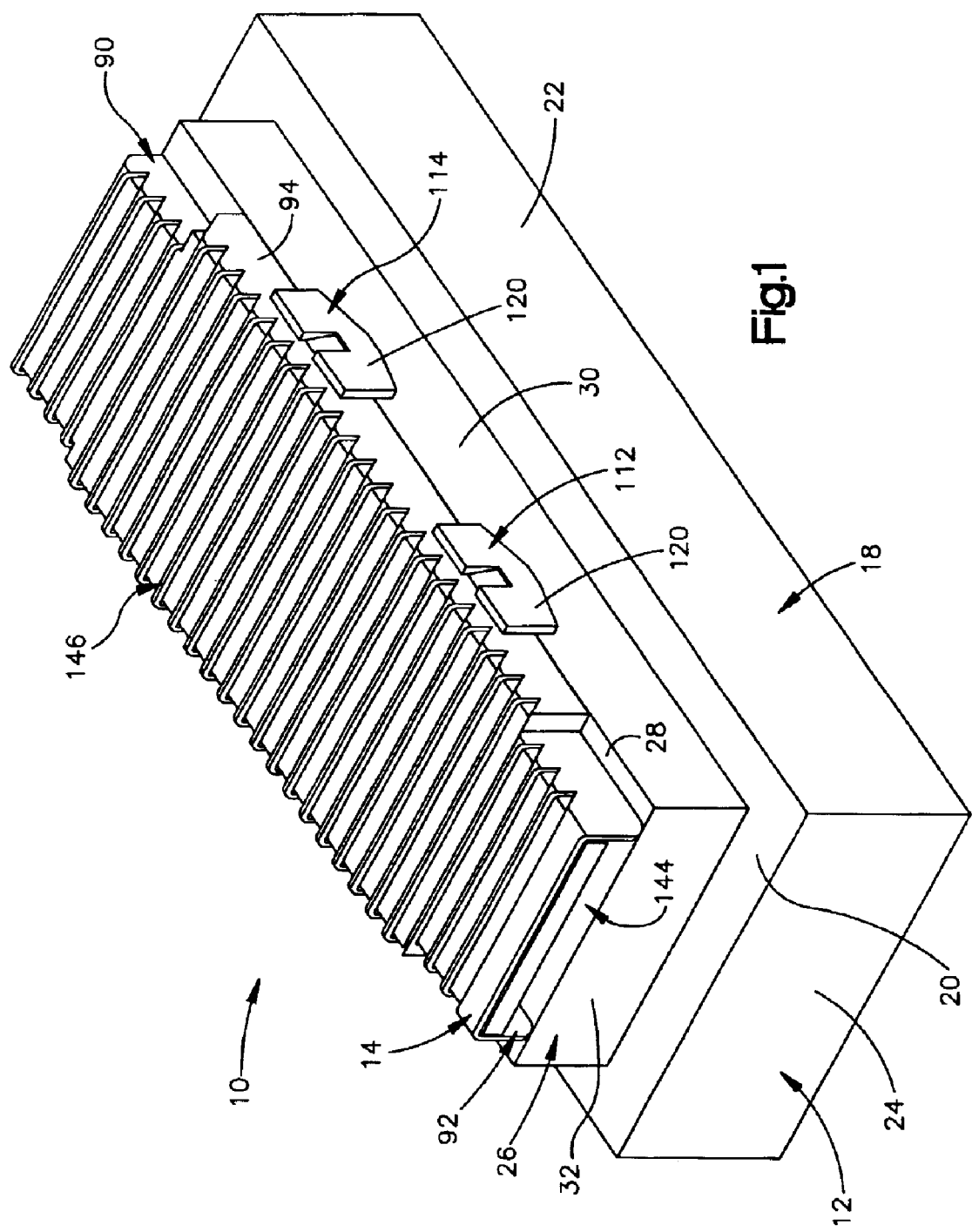
FIG. 1 is a perspective view of an apparatus constructed in accordance with the present invention.
Figure 2:
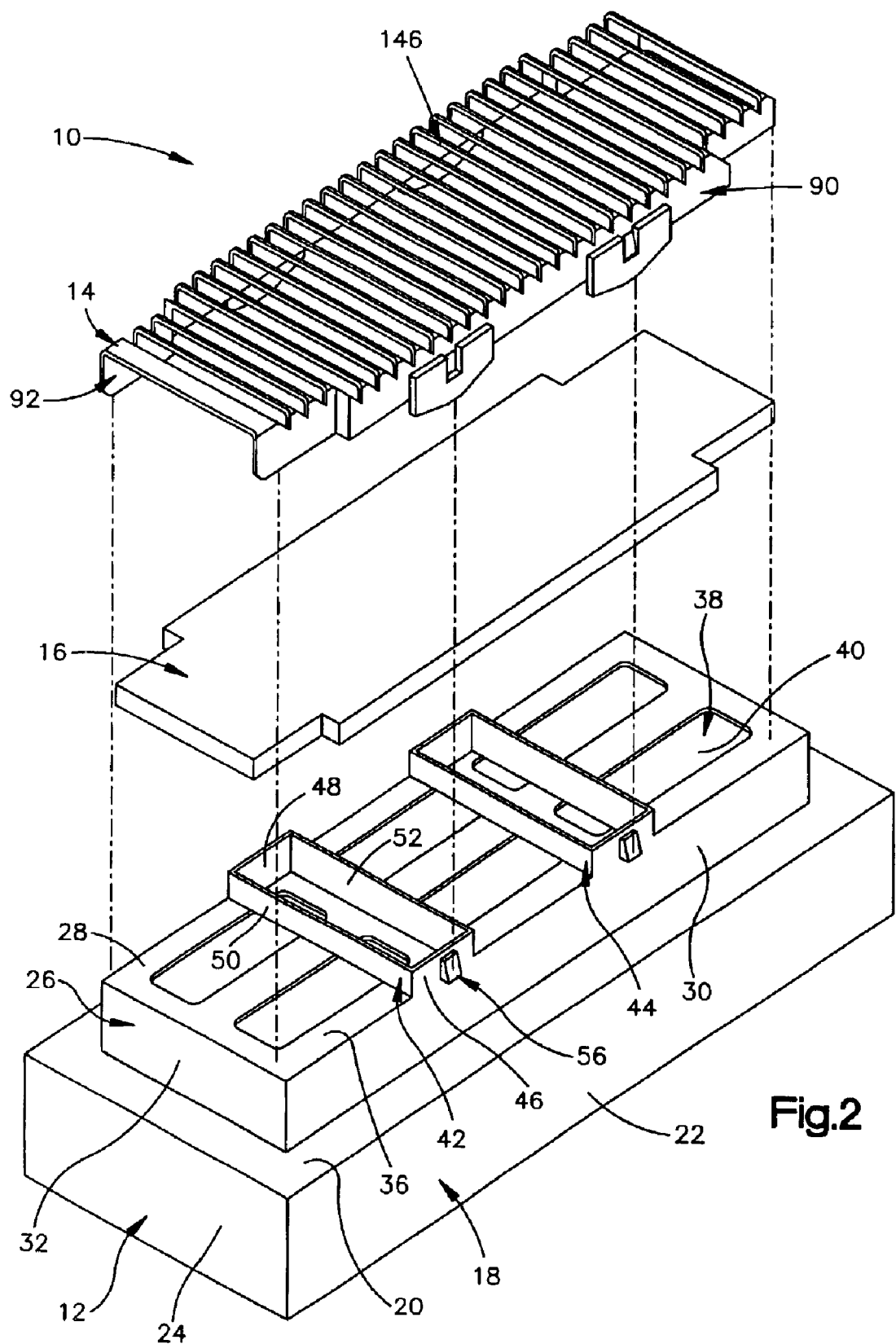
FIG. 2 is an exploded perspective view of the apparatus of FIG. 1.

FIG. 1 is a perspective view of an apparatus 10 constructed in accordance with the present invention. FIG. 2 illustrates an exploded perspective view of the apparatus 10. The apparatus 10 includes a pressure relief valve 12, a noise-reducing member 14, and a sound-absorbing insert 16.

The pressure relief valve 12 includes a rectangular box-shaped main body portion 18. The main body portion 18 includes an upper wall 20 and four side walls. The four side walls includes opposite first and second long side walls (only the first long side wall is shown at 22) and opposite first and second short side walls (only the first short side wall is shown at 24). The main body portion 18 includes an open bottom (not shown). The upper wall 20 of the main body portion 18 includes a central opening (not shown). The side walls of the main body portion 18 define a flow conduit (not shown) that provides fluid communication between the central opening of the main body portion 18 and the open bottom.

A rectangular box-shaped protrusion 26 extends upwardly from the upper wall 20 of the main body portion 18. The protrusion 26 also includes an upper wall 28 and four side walls. The four side walls of the protrusion 26 includes opposite first and second long side walls (only the first long side wall is shown at 30) and opposite first and second short side walls (only the first short side wall is shown at 32). The first and second long side walls of the protrusion 26 have a length that is approximately eighty percent of a length of the first and second long side walls of the main body portion 18. Similarly, the first and second short side walls of the protrusion 26 have a length that is approximately eighty percent of a length of the first and second short side walls of the main body portion 18.

The four side walls of the protrusion 26 surround the central opening in the upper wall 20 of the main body portion 18. As a result, the central opening in the upper wall 20 of the main body portion 18 defines an open bottom (not shown) of the protrusion 26. The upper wall 28 of the protrusion 26 includes an inner surface 34 (FIG. 5) and an outer surface 36. Six openings, one of which is indicated at 38 in FIG. 2, extend through the upper wall 28 from the inner surface 34 to the outer surface 36. The four side walls of the protrusion 26 define a flow conduit (not shown) that provides fluid communication between the six opening 38 of the protrusion 26 and the open bottom of the protrusion 26. The flow conduit through the main body portion 18 and the flow conduit through the protrusion 26, collectively, enable airflow through the pressure relief valve 12 between the six openings 38 in the upper wall 28 of the protrusion 26 and the open bottom of the main body portion 18.

The pressure relief valve 12 also includes six gates, one of which is indicated at 40 in FIG. 2. Each of the openings 38 in the upper wall 28 of the protrusion 26 includes an associated gate 40. The gates 40 are secured to the inner surface 34 of the upper wall 28 of the protrusion 26. Each gate 40 is movable between first and second positions. In the first position, the gate 40 closes the opening 38 in the upper wall 28 of the protrusion 26. In the second position, the gate 40 is moved away from the opening 38 to enable airflow through the opening 38.

The gates 40 may be formed from rigid material or a flexible material. When formed from a rigid material, the gates 40 are rotatably connected to the inner surface 34 of the upper wall 28 of the protrusion 26. When formed from flexible material, an end of each of the gates 40 is attached to the inner surface 34 of upper wall 28 of the protrusion 26 and the gates 40 are adapted to bend away from the openings 38 to enable airflow through the openings 38.

The pressure relief valve 12 also includes first and second locking members 42 and 44 (FIG. 2), respectively. The first and second locking members 42 and 44 extend upwardly from the upper wall 28 of the protrusion 26. The first and second locking members 42 and 44 are located equidistance from a midpoint between the first and second short side walls of the protrusion 26.

The first locking member 42 is rectangular and includes four wall portions 46, 48, 50, and 52. First and second short wall portions 46 and 48, respectively, extend upwardly from the first and second long side walls, only long side wall 30 is shown, of the protrusion 26. The first short wall portion 46 is located in the same plane as the first long side wall 30 of the protrusion 26. Similarly, the second short wall portion 48 is located in the same plane as the second long side wall of the protrusion 26.

Each of the first and second short wall portions 46 and 48 of the first locking member 42 includes an outwardly extending locking tab 56. FIG. 6 illustrates a cross-section of the locking tab 56 on the first short wall portion 46 of the first locking member 42. The locking tab 56 tapers outwardly of the first short wall portion 46 as the locking tab 56 nears the first long side wall 30 of the protrusion 26. The locking tab 56 includes a lower locking surface 58 (FIG. 6). The locking tab (not shown) of the second short wall portion 48 is identical to the locking tab 56 of the first short wall portion 46. First and second long wall portions 50 and 52, respectively, connect the first and second short wall portions 46 and 48 of the first locking member 42. The first and second long wall portions 50 and 52 add rigidity to the first locking member 42. The second locking member 44 is identical to the first locking member 42.

As shown in FIG. 3, the pressure relief valve 12 is mountable to a panel 64 of a vehicle 66 so that the protrusion 26 of the pressure relief valve 12 extends into an aperture 68 in the panel 64. When mounted to the panel 64, a seal 70 extends around the perimeter of the protrusion 26 on the upper wall 20 of the main body portion 18 of the pressure relief valve 12 for sealing against an exterior surface 72 of the vehicle panel 64.

The pressure relief valve 12 separates the passenger compartment, indicated at 76 in FIG. 3, and atmosphere, indicated at 78 in FIG. 3. When air pressure in the passenger compartment 76 increases above atmospheric pressure, the differential air pressure acts on the gates 40 to move the gates 40 from the first position closing the openings 38 to the second position to enable airflow through the openings 38 and from the passenger compartment 76 to atmosphere 78. When the air pressure in the passenger compartment and atmospheric pressure equalize, the gates 40 are moved back into the first position closing the openings 38. The gates 40 may be biased toward the first position by, for example, a spring. When the gates 40 are formed from a flexible material, the natural tendency of the flexible material may bias the gates 40 into the first position. Alternatively, the pressure relief valve 12 may be oriented in the vehicle 66 so that gravity causes the gates 40 to close when the air pressure in the passenger compartment 76 and atmospheric pressure equalize.

When atmospheric pressure increases above the air pressure in the passenger compartment 76 of the vehicle 66, the gates 40 remain in the first position. The upper wall 28 of the protrusion 26 prevents movement of the gates 40 from the first position closing the openings 38 when atmospheric pressure is greater than the air pressure in the passenger compartment 76 of the vehicle 66. As a result, the gates 40 prevent airflow from atmosphere 78 into the passenger compartment 76 to equalize the air pressure between atmosphere 78 and the passenger compartment 76. Since the gates 40 are not sealed against the inner surface 34 of the upper wall 28 of the protrusion 26, a small amount of air may flow from atmosphere 78, through the openings 38 of the pressure relief valve 12, and into the passenger compartment 76 of the vehicle 66 when atmospheric pressure is greater than the air pressure in the passenger compartment 76. This small amount of flow is generally referred to as backflow. The backflow through the pressure relief valve 12 may carry atmospheric noise into the passenger compartment 76 of the vehicle 66.

Testing of an exemplary pressure relief valve showed a forward airflow, i.e., from the passenger compartment to atmosphere, of 107 SCFM (standard cubic feet per minute) at a pressure of 0.50 inches of water. The testing also showed a backward airflow or backflow, i.e., from atmosphere to the passenger compartment, of 0.04 SCFM at a pressure of 0.50 inches of water.

The noise-reducing member 14 of the present invention helps to reduce the noise entering the passenger compartment 76 of the vehicle 66 through the pressure relief valve 12. FIG. 1 is a perspective view of the noise-reducing member 14 attached to the pressure relief valve 12. FIG. 4 is a perspective bottom view of the noise-reducing member 14.

The noise-reducing member 14 includes opposite first and second side walls 90 and 92, respectively. The first and second side walls 90 and 92 are mirror images of one another. The first side wall includes interior and exterior surfaces 94 (only the exterior surface being shown in FIG. 4). The second side wall also includes interior 96 and exterior surfaces (only the interior surface being shown in FIG. 4).

As shown in FIG. 4, each of the first and second side walls 90 and 92 includes first and second end portions 100 and 102, respectively, and a central portion 104. The first and second end portions 100 and 102 of side wall 90 are located in a common plane. Similarly, the first and second end portions 100 and 102 of side wall 92 are located in a common plane. The central portion 104 and each side wall 90 and 92 is located in a plane that extends parallel to the plane of the first and second end portions 100 and 102 for that side wall 90 or 92. Each of the first and second side walls 90 and 92 includes a first transverse portion 106 that connects the first end portion 100 to the central portion 104. Similarly, each of the first and second side walls 90 and 92 includes a second transverse portion 108 that connects the second end portion 102 to the central portion 104.

The distance between the exterior surfaces of the central portions 104 of the first and second side walls 90 and 92 of the noise-reducing member 14 is identical to the length between the first and second short wall portions 46 and 48 of the first and second locking members 42 and 44 of the pressure relief valve 12. The distance between the exterior surfaces of the first and second end portions 100 and 102 of the first and second side walls 90 and 92 is approximately eighty percent of the distance between the exterior surfaces of the central portions 104.

The central portions 104 of the first and second side walls 90 and 92 include rectangular cutouts 110 (FIG. 4) at locations corresponding to the short wall portions 46 and 48 of each of the first and second locking members 42 and 44 of the pressure relief valve 12. Each cutout 110 is sized for receiving an associated short wall portion 46 or 48 of a respective locking member 42 or 44 of the pressure relief valve 12.

The central portion 104 of each of the first and second side walls 90 and 92 of the noise-reducing member 14 includes first and second locking members 112 and 114. The locking members 112 and 114 enable the noise-reducing member 14 to be attached to the pressure relief valve 12. Each locking member 112 and 114 is associated with a cutout 110 in the central portion 104 of a respective one of the first and second side walls 90 and 92.

Each locking member 112 and 114 includes a pentagonal-shaped wall 120. An upper portion of the wall 120 of each locking member 112 and 114 overlays its associated cutout 110. A lower portion of the wall 120 of each locking member 112 and 114 extends below, as viewed in FIG. 3, the respective side wall 90 and 92.

As shown in FIG. 4, the wall 120 of each locking member 112 and 114 is planar and includes interior and exterior surfaces 122 and 124, respectively. The interior surface 122 of the wall 120 of each locking member 112 and 114 aligns with and extends parallel to the exterior surface, only surface 94 is shown, of the respective side walls 90 and 92. As shown in FIG. 5, each locking member 112 and 114 includes an upper surface 126, first and second side surfaces 128 and 130, respectively, and first and second lower surfaces 132 and 134, respectively. The first and second side surfaces 128 and 130 extend partially below the respective side wall 92 and the first and second lower surfaces 132 and 134 are located completely below the respective side wall 92. The first and second lower surfaces 132 and 134 of each locking member 112 and 114 meet at an angle 136 (FIG. 5) below the respective side wall 90 and 92.

A through-hole 138 (FIG. 4) extends through the wall 120 of each locking member 112 and 114. The through-hole 138 aligns vertically, as shown in FIG. 3, with the angle 136. The through-hole 138 is located adjacent the upper surface 126 of the wall 120 of the locking member 112 and 114 and extends downwardly toward the angle 136 through approximately one-half of the wall 120. As is described below, each through-hole 138 is adapted to receive an associated locking tab 56 of the pressure relief valve 12.

As best shown in FIG. 4, the noise-reducing member 14 also includes an end wall 142. The end wall 142 connects the second end portions 102 of the first and second side walls 90 and 92 and extends generally perpendicular to the first and the second side walls 90 and 92. The noise-reducing member 14 includes an open end 144 between the first end portions 100 of the first and second side walls 90 and 92.

The noise-reducing member 14 also includes an upper wall 146. The upper wall 146 connects the first and second side walls 90 and 92 and is formed from a plurality of slats 148 (FIG. 5). Each slat 148 extends between the first and second side walls 90 and 92. As shown in FIG. 7, each slat 148 includes parallel upper and lower surfaces 150 and 152, respectively. The upper and lower surfaces 150 and 152 of each slat 148 are angled at a forty-five degree angle relative to horizontal, as shown in FIG. 7, so that each slat 148 includes an upper end 154 that is spaced above a lower end 156 of an adjacent slat 148. A louver 158 is defined between adjacent slats 148. Each louver 158 enables airflow through the upper wall 146 of the noise-reduction member 14. In an exemplary embodiment of the noise-reduction member 14, twenty-six louvers 158 extend through the upper wall 146. The twenty-six louvers 158 include three louvers extending between each of the first and second end portions 100 and 102 of the first and second side walls 90 and 92 and twenty louvers extending between the central portions 100.

The noise-reduction member 14 is preferably injection molded from a plastic material, such as a polypropylene material. The plastic material used for forming the noise-reduction member 14 provides some flexibility to the lower portions of the locking members 112 and 114 to enable a slight outward deflection of the lower portions of the locking members 112 and 114.

The sound-absorbing insert 16 is shaped to fit against the upper wall 146 of the noise-reducing member 14. The sound-absorbing insert 16 may include, for example, an open cell foam having sound absorption properties or other types of sound-absorbing materials, such as THINSULATE acoustic insulation available from 3M of St. Paul, Minn. Preferably, the sound-absorbing insert 16 is 1.5 to 2 millimeters thick.

To assemble the apparatus 10 of the present invention, the sound-absorbing insert 16 is adhered to an interior surface of the upper wall 146 of the noise-reducing member 14. The sound-absorbing insert 16 may be heat welded to the upper wall 146 or an adhesive may be used to attach the sound-absorbing insert 16 to the upper wall 146. The noise-reducing member 14 is then attached to the pressure relief valve 12.

To attach the noise-reducing member 14 to the pressure relief valve 12, the cutouts 110 in the first and second side walls 90 and 92 of the noise-reducing member 14 are aligned with the short wall portions 46 and 48 of the locking members 42 and 44 of the pressure relief valve 12. The noise-reducing member 14 is then pushed downwardly, as viewed in FIG. 2, so that the short wall portions 46 and 48 of the locking members 42 and 44 are received in the associated cutouts 110. As the noise-reducing member 14 is moved downwardly, the lower portion of each locking member 112 and 114 of the noise-reducing member 14 engages a locking tab 56 of a locking member 42 and 44 of the pressure relief valve 12. The locking tab 56 deflects the lower portion of each locking member 112 and 114 outwardly as the noise-reducing member 14 is moved downwardly relative to the pressure relief valve 12. When the locking tab 56 reaches the through-hole 138 of the locking member 112 and 114, the locking tab 56 snaps into the through hole 138, as is shown in FIG. 6. The snap-fit connection of the locking members 112 and 114 of the noise-reducing member 14 and the locking members 42 and 44 of the pressure relief valve 12 fixedly secures the noise-reducing member 14 to the pressure relief valve 12.

When the noise-reducing member 14 is attached to the pressure relief valve 12, an air chamber 160 (FIG. 5) is defined between the upper wall 28 of the protrusion 26 of the pressure relief valve 12 and the upper wall 146 of the noise-reducing member 14. Preferably, the distance between the upper wall 28 of the protrusion 26 and the upper wall 146 of the noise-reducing member 14 is approximately four millimeters. The air chamber 160 is in fluid connection with the openings 38 of the pressure relief valve 12 so that any air flowing through the openings 38 of the pressure relief valve 12 flows through the air chamber 160.

FIG. 3 illustrates the apparatus 10 of the present invention mounted to the panel 64 of a vehicle 66. When mounted to the panel 64, the noise-reducing member 14 of the apparatus 10 is located in the interior of the vehicle, i.e., in the passenger compartment 76.

When the air pressure within the passenger compartment 76 of the vehicle 66 is greater than atmospheric pressure, air flows through the louvers 158 and into the air chamber 160. Differential pressure acts on the gates 40 of the pressure relief valve 12 to move the gates 40 from the first position closing the openings 38 to the second position enabling airflow through the pressure relief valve 12. When the gates 40 are in the second position, air flows through the louvers 158 in the upper wall 146 on the noise-reducing member 14, through the sound-absorbing insert 16, through the air chamber 160, and through the pressure relief valve 12 to atmosphere 78.

As discussed above, when atmospheric pressure is greater than the air pressure in the passenger compartment 76 of the vehicle 66, some backward airflow or backflow may pass through the pressure relief valve 12. The backflow through the pressure relief valve 12 may include atmospheric noise. Additionally, sound waves carrying atmospheric noise may pass through the pressure relief valve 12 other than with backflow. To reduce the noise entering the passenger compartment 76 through the pressure relief valve 12, the apparatus 10 of the present invention directs the backflow and any other sound waves passing through the pressure relief valve through a tortuous path between the pressure relief valve 12 and the passenger compartment 76 of the vehicle 66 in which the direction of travel is changed.

For example, any backflow that passes through the openings 38 of the pressure relief valve 12 and into the air chamber 160 travels generally in a direction indicated by arrow A in FIG. 7. The slats 148 in the upper wall 146 of the noise-reducing member 14 prevent the backflow from exiting the air chamber 160 in the same direction, i.e., direction A, as the backflow enters the air chamber 160. The slats 148 in the upper wall 146 deflect the backflow and cause the backflow exiting the air chamber 160 through the upper wall 146 of the noise-reducing member 14 to change direction, to the direction indicated by arrow B in FIG. 7. When the slats 148 deflect the backflow to the direction indicated by arrow B, some of the backflow and some of the noise carried by the backflow are reflected back into the air chamber, as is indicated schematically in FIG. 7 with arrow C. As a result, the noise exiting the air chamber 160 and entering the passenger compartment 76 of the vehicle 66 is reduced. Additionally, prior to being deflected by the slats 148 in the upper wall 146 of the noise-reducing member 14, the backflow passes through the sound-absorbing insert 16. The sound-absorbing insert 16 further reduces the noise exiting the air chamber 160 and entering the passenger compartment 76. As a result, the passenger detectable noise in the passenger compartment 76 of the vehicle 66 is reduced.

Although the noise-reducing member 14 includes an open end 144, backflow generally will not pass through the open end 144 when exiting the air chamber 160 to the passenger compartment 76. For the backflow to pass through the open end 144, the backflow through the pressure relief valve 12 must change directions from the direction indicated by arrow A to the direction indicated by arrow D in FIG. 7. The backflow must also travel along the length of the air chamber 160 to exit the open end 144. As a result, resistance to the backflow exiting the air chamber 160 through the open end 144 is generally greater than resistance to backflow exiting the air chamber 160 through the sound-absorbing insert 16 and the louvers 158. Since backflow will take the path of least resistance, the backflow generally will pass through the sound-absorbing insert 16 and the louvers 158 when exiting the air chamber 160 toward the passenger compartment 76.

The noise-reducing member 14 and the sound-absorbing insert 16 act in a similar manner to reduce noise carried by sound waves that pass through the pressure relief valve 12 other than with backflow. Since the slats 148 reflect some of the sound waves back into the air chamber 160 and the sound-absorbing insert 16 absorbs or attenuates some of the sound waves, the passenger detectable noise within the passenger compartment is reduced.

From the above description of the invention, those skilled in the art will perceive improvements, changes and modifications. For example, the shape of the pressure relief valve 12, the noise-reducing member 14, and the sound-absorbing insert 16 may be changed. Such improvements, changes and modifications within the skill of the art are intended to be covered by the appended claims.

Having described the invention, we claim the following:

1. An apparatus comprising:
   a pressure relief valve for relieving air pressure from a passenger compartment of a vehicle, the pressure relief valve enabling airflow from the passenger compartment to atmosphere; and
   a member for reducing noise entering the passenger compartment through the pressure relief valve from the atmosphere, the member including structure for attaching the member to the pressure relief valve, the member defining an air chamber that is interposed between the passenger compartment of the vehicle and the pressure relief valve, the member including a wall for deflecting airflow exiting the air chamber toward the passenger compartment, wherein the wall includes a plurality of slats which define louvers in the wall, the louvers providing fluid communication between the air chamber and the passenger compartment, the slats including a surface for reflecting noise back into the air chamber.

2. The apparatus of claim 1 further including a sound-absorbing insert located in the air chamber.

3. The apparatus of claim 2 wherein the sound-absorbing insert is attached to the slats of the wall, the sound-absorbing insert having a thickness that is less than a distance through the air chamber between the pressure relief valve and the wall having the slats.

4. An apparatus comprising:

a pressure relief valve for relieving air pressure from a passenger compartment of a vehicle, the pressure relief valve enabling airflow from the passenger compartment to atmosphere; and a member for reducing noise entering the passenger compartment through the pressure relief valve from the atmosphere, the member including structure for attaching the member to the pressure relief valve, wherein the structure includes a plurality of locking members, the pressure relief valve including corresponding locking members, the locking members of the member and the corresponding locking members of the pressure relief valve interlocking to attach the member to the pressure relief valve.

5. The apparatus of claim 4 wherein each of the locking members of the member includes one of a wall having a through-hole and a locking tab for snapping into the through-hole and wherein each of the corresponding locking members of the pressure relief valve includes the other of the wall having a through-hole and the locking tab.

6. An apparatus for reducing noise entering a passenger compartment of a vehicle through a vehicle pressure relief valve, the apparatus comprising:

a member associated with the pressure relief valve, the member defining an air chamber which is interposed between the passenger compartment and the pressure relief valve, the member including a wall having a plurality of angled slats that define louvers through which air flows between the passenger compartment and the air chamber, the plurality of slats changing a direction of air flowing between the passenger compartment and the air chamber so as to reduce noise entering the passenger compartment through the pressure relief valve.

7. The apparatus of claim 6 further including a sound-absorbing insert located in the air chamber.

8. The apparatus of claim 7 wherein the sound-absorbing insert is attached to the slats of the wall, the sound-absorbing insert having a thickness that is less than a distance through the air chamber between the pressure relief valve and the wall having the slats.

9. The apparatus of claim 6 wherein the member includes structure for attaching the member to the pressure relief valve.

10. The apparatus of claim 9 wherein the structure includes a plurality of locking members, the pressure relief valve including corresponding locking members, the locking members of the member and the corresponding locking members of the pressure relief valve interlocking to attach the member to the pressure relief valve.

11. The apparatus of claim 10 wherein each of the locking members of the member includes one of a wall having a through-hole and a locking tab for snapping into the through-hole and wherein each of the corresponding locking members of the pressure relief valve includes the other of the wall having a through-hole and the locking tab.

12. An apparatus comprising:

a pressure relief valve for relieving air pressure from a passenger compartment of a vehicle, the pressure relief valve enabling airflow from the passenger compartment to atmosphere; and a member for reducing noise entering the passenger compartment through the pressure relief valve from the atmosphere, the member defining an air chamber that is interposed between the passenger compartment of the vehicle and the pressure relief valve, the member including a wall for deflecting airflow exiting the air chamber toward the passenger compartment, wherein the wall includes a plurality of slats which define louvers in the wall, the louvers providing fluid communication between the air chamber and the passenger compartment, the slats including a surface for reflecting noise back into the air chamber.

13. The apparatus of claim 12 further including a sound-absorbing insert located in the air chamber.

14. The apparatus of claim 13 wherein the sound-absorbing insert is attached to the slats of the wall, the sound-absorbing insert having a thickness that is less than a distance through the air chamber between the pressure relief valve and the wall having the slats.

15. An apparatus comprising:

a pressure relief valve for relieving air pressure from a passenger compartment of a vehicle, the pressure relief valve having a gate with opposite first and second faces, air pressure in the passenger compartment acting on the first face of the gate and atmospheric pressure acting on the second face of the gate, the gate moving to an open position in response to a predetermined pressure differential acting on the first and second faces, the pressure relief valve, when in the open position, enabling airflow from the passenger compartment to atmosphere;

means for reducing noise entering the passenger compartment through the pressure relief valve from the atmosphere, the means for reducing noise defining an air chamber and including means for changing a direction of air flowing between the passenger compartment and the air chamber;

a sound-absorbing insert also for reducing noise entering the passenger compartment through the pressure relief valve from the atmosphere, wherein the means for changing the direction of air flowing between the passenger compartment and the air chamber includes a plurality of slats which define louvers, the louvers providing fluid communication between the air chamber and the passenger compartment, the slats including a surface for reflecting noise back into the air chamber.

* * * * *

UNITED STATES PATENT AND TRADEMARK OFFICE
CERTIFICATE OF CORRECTION

PATENT NO. : 6,866,576 B2
DATED : March 15, 2005
INVENTOR(S) : Quinn et al.

It is certified that error appears in the above-identified patent and that said Letters Patent is hereby corrected as shown below:

Title page,
Item [73], Assignee, after "Livonia, MI (US)" insert -- General Motors Corporation, Detroit, MI (US) --.

Signed and Sealed this

Twelfth Day of July, 2005

JON W. DUDAS
*Director of the United States Patent and Trademark Office*